(12) United States Patent
Gifford et al.

(10) Patent No.: US 7,627,895 B2
(45) Date of Patent: Dec. 1, 2009

(54) TRUST TOKENS

(75) Inventors: Maurice M Gifford, Ipswich (GB);
Nicholas H Edwards, Ipswich (GB);
Paul J Kearney, Felixstowe (GB)

(73) Assignee: British Telecommunications plc, London (GB)

( * ) Notice: Subject to any disclaimer, the term of this patent is extended or adjusted under 35 U.S.C. 154(b) by 406 days.

(21) Appl. No.: 10/592,757

(22) PCT Filed: Mar. 21, 2005

(86) PCT No.: PCT/GB2005/001064

§ 371 (c)(1),
(2), (4) Date: Sep. 14, 2006

(87) PCT Pub. No.: WO2005/096117

PCT Pub. Date: Oct. 13, 2005

(65) Prior Publication Data

US 2007/0192619 A1   Aug. 16, 2007

(30) Foreign Application Priority Data

Mar. 31, 2004   (GB) ................... 0407369.8

(51) Int. Cl.
G06F 7/04 (2006.01)
H04L 9/32 (2006.01)
G06F 21/00 (2006.01)

(52) U.S. Cl. ............ 726/9; 726/5; 726/6; 726/7; 726/18; 726/19; 726/20; 713/176; 713/186; 713/156; 235/380; 235/382

(58) Field of Classification Search .......... 235/380, 235/382; 713/156, 186, 176; 726/5–7, 9, 726/18–20
See application file for complete search history.

(56) References Cited

U.S. PATENT DOCUMENTS

| 6,070,141 | A  | * | 5/2000  | Houvener et al. ............ 705/1 |
| 6,366,682 | B1 |   | 4/2002  | Hoffman et al. |
| 6,484,260 | B1 | * | 11/2002 | Scott et al. .................. 713/186 |
| 7,010,565 | B2 | * | 3/2006  | Sampson ..................... 709/202 |
| 7,191,466 | B1 | * | 3/2007  | Hamid et al. ................... 726/3 |
| 2001/0005839 | A1 | * | 6/2001 | Maenpaa et al. ............. 705/65 |
| 2003/0140223 | A1 |   | 7/2003 | Desideri |

(Continued)

FOREIGN PATENT DOCUMENTS

EP   1139200 A2   10/2001

(Continued)

OTHER PUBLICATIONS

Yesberg et al., "Quantitative Authentication and Vouching", Computers & Security, Elsevier Science Publishers, Amsterdam, NL, vol. 15, No. 7, 1996, pp. 633-645, XP004016334.

(Continued)

*Primary Examiner*—Christopher A Revak
*Assistant Examiner*—Trang Doan
(74) *Attorney, Agent, or Firm*—Nixon & Vanderhye PC

(57) ABSTRACT

A token issuer and an authentication device provide an identity confirmation device. A token issuer is programmable by a central identity provider to issue certification tokens for use in e-commerce whereby transactions can be certified with suppliers without need for additional communication with a central server.

18 Claims, 2 Drawing Sheets

U.S. PATENT DOCUMENTS

| | | | |
|---|---|---|---|
| 2003/0140233 A1* | 7/2003 | Samar | 713/186 |
| 2003/0145204 A1 | 7/2003 | Nadooshan et al. | |
| 2005/0091543 A1* | 4/2005 | Holtzman et al. | 713/202 |

FOREIGN PATENT DOCUMENTS

| | | |
|---|---|---|
| EP | 1389752 A2 | 2/2004 |
| WO | WO 01/13198 A1 | 2/2001 |
| WO | WO 03/062969 A1 | 7/2003 |

OTHER PUBLICATIONS

Elliott, "Signing on the Digital Line", IEE Review, Sep. 1999, pp. 222-225.

Article from Sun "Inner Circle", http://wwws.sun.com/software/sunone/innercircle/newsletter/feature_0402.html, Dec. 29, 2003.

International Search Report dated Jun. 13, 2005.

GB Search Report dated Jul. 2, 2004.

* cited by examiner

TRUST TOKENS

BACKGROUND

1. Technical Field

This application is the US national phase of international application PCT/GB2005/001064 filed 21 Mar. 2005 which designated the U.S. and claims benefit of GB 0407369.8, dated 31 Mar. 2004, the entire content of which is hereby incorporated by reference.

The present invention relates to a trust token or identity confirmation device and more particularly, but not exclusively, to such a token or device for use in electronic certification.

2. Related Art

Any transaction requires an element of trust between the participants. The notion of trust can be formalised along the following lines. Suppose we have a situation in which one party (B) has offered some commitment to another party (A), possibly in return for some reciprocal commitment. Party A cannot be certain that B will complete its commitment. If party A accepts the offer from B, it will subsequently act on the assumption that B will complete its commitment—for example by providing a service to B in the expectation that B will pay for it or, conversely, by paying B in advance for a service B is expected to provide. Should B fail to do so, then A may suffer some loss.

As a rational agent, A will only accept B's offer if it perceives the risks to be outweighed by the probable benefits, where 'risk' takes into account the probability of B failing to deliver and the cost to A of this eventuality. If A accepts, then it can be said to "trust" B in the context of this transaction. The degree of perceived risk involved is a measure of the amount of trust A is placing in B.

When conducting transactions electronically, for example over an open distributed system such as the "Internet", there are a number of particular problems that arise in establishing trust. In particular it is quite possible that the parties will have had little or no prior contact or knowledge of reputation or brand. For example, one party may have found the other using an on-line directory of some sort. It is also relatively difficult to confirm the identity of the other party. For example one of the parties may be disguising itself as a more reputable party.

One method of establishing trust between parties is disclosed in our co-pending United Kingdom patent application no 0405623.0. In order to provide trust certification a third party trusted by one of the parties can be used to certify the transaction and provided that that third party is also trusted by the other party mutual trust can be established.

The third party to a transaction may be thought of as an identity provider which certifies the identity of parties to a transaction. This identity provider may be implemented as a centralised server or server cluster providing identities on behalf of all of its subscribers—that is the owners of the identities being certified.

In published United States Patent Application No. US2003/0140223—Desideri, there is disclosed an identity authentication system in which a smart card or other storage device includes data defining a biometric characteristic certified by an authority such as a passport office and includes a digital signature or private key which in combination with a public key may be used to identify an individual present at a point of sale terminal.

Such a system requires the user to be present in the same place as the transaction takes place. This is not entirely a suitable arrangement for e-commerce or for user certification of an interactive computer session.

In one example of interactive computer sessions, for example where single sign on access to multiple servers is required a central server to which the user is logged on and which "trusts" the identity of the user issues tokens which certify trust for the session with other servers.

BRIEF SUMMARY

According to the present inventions there is provided an identity confirmation device comprising a memory card including readable data and a writeable data store, the device being programmable by a security server and including data defining the user identity, data derived from a user feature and digital signature data issued by the security server, the device being used in combination with a reader arranged to derive the user identity, compare user feature data with the user present and issuing a single use token confirming the validity of a transaction certified by the digital signature data; in which the device includes multiple person identities stored thereon, the strength of token issued being dependent upon the number of confirmed identities of persons present at the time of issue of the token.

Preferably the issued token has an associated trust value the strength of which may decay over time.

The trust value associated with a single-use token may be varied so that the strength of trust may be lower for each successive token issued. The strength may also decay more rapidly as the total value of tokens issued increases. The strength of trust may also be varied in dependence upon the confidence level in the biometric authenticity determined at the time of issue of the token.

Each token issued may include a time stamp certifying the token for use within a pre-determined time window. In a preferred use of the identity confirmation device the use of public keys in combination therewith eliminates the need for private keys for certification purposes.

In one further use of the system, a plurality of identity confirmation devices each having multiple person identities stored thereon, possibly with each individual's personal identity being distributed as partial identities, each device in an authentication set storing a plurality of such partial identities relating to a respective plurality of users whereby a token issued may be used to confirm the presence of a sufficient combination of people present to certify the transaction.

An identity confirmation device in accordance with the invention will now be described by way of example only with reference to the accompanying drawings of which:

DETAILED DESCRIPTION OF EXEMPLARY EMBODIMENTS

Figure 1:
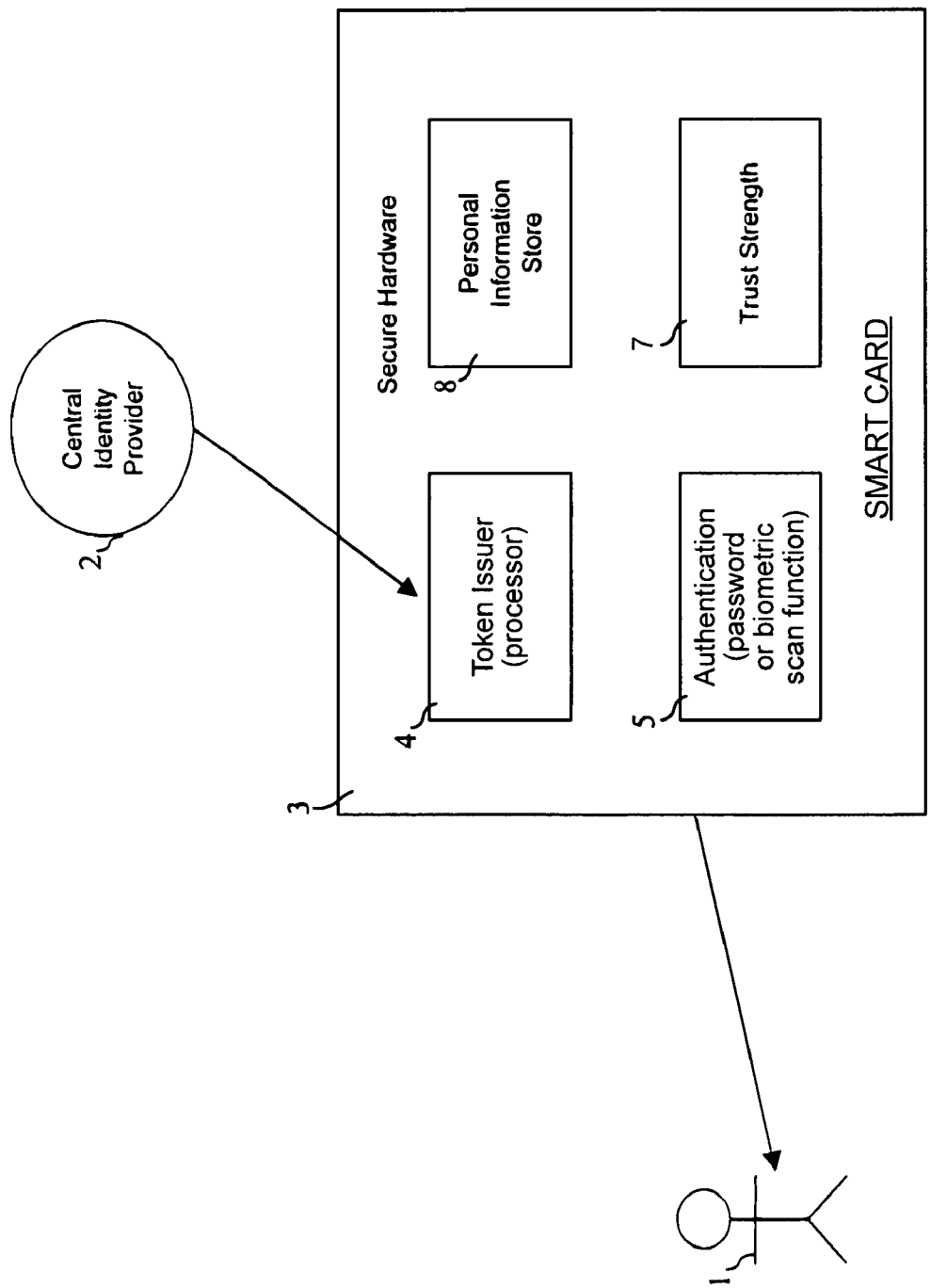
FIG. 1 is a schematic representation of an initialisation process.

Referring to FIG. 1, a user 1 enters into an agreement with a central identity provider 2, the identity provider 2 having agreements with a number of suppliers or being trusted by such suppliers. The central identity provider then provides the user with secure hardware, for example a smart card 3 having an on-board processor 4.

In normal e-commerce certification, the standard approach to user authentication is for identity to be certified by a central identity provider (e.g. as 2), the user 1 in return receiving a software token that is presented to service providers as evidence that the identity has been verified.

In the present exemplary embodiment, once the user has been verified by the central identity provider 2 and has been issued with the smart card 3, the secure hardware can be programmed to issue tokens directly without further intervention of the central identity provider 2, but with that provider's certification. This enables the smart card 3 to itself confirm the identity and physical presence of the user 1 and to issue tokens. Thus, a secure processing platform 4 and a memory having at least a personal information store 8, and data storage for other features required to be provided and issue tokens without having to send credentials over the Internet is provided.

The token issuer of the card 3 stands in for the real identity provider 2. The user hardware may initially be programmed at the premises of the central identity provider 2 and despatched to the user 1. In subsequent transactions however the user may contact the central identity provider 2 by way of the network which can verify the user presence and update over a secure link the hardware of the card 3.

The essence of good practice of verification of identity is that a number of dissimilar characteristics are applied. At least two dissimilar factors are included in the characteristics among them an article in possession of the user 1 (i.e. the smart card 3) something the user knows, for example a password, and some measurable biometric characteristic of the user 1. Thus, the central identity provider 2 on authenticating the presence of the user 1 and the smart card 3 on a network basis will update the token issuer section of the processor 4 which will refer to the authentication requirement prior to issuing a token which is digitally signed. Authentication may be by means of e.g. a fingerprint or iris scan function 5 so that even if the card 3 is stolen authentication will fail and a secure token will not be issued.

Figure 3:
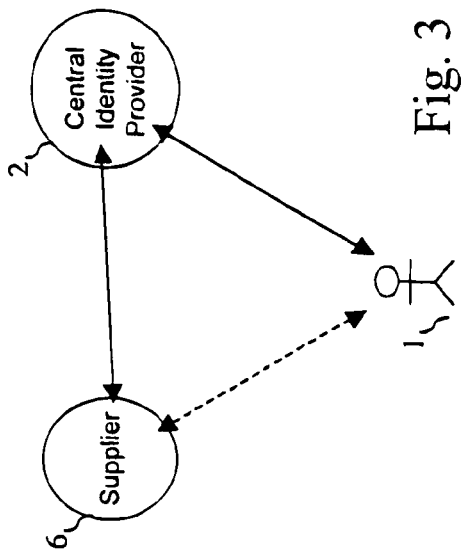
FIG. 3 is an entity relationship diagram showing the trust relationship.

Referring briefly to FIG. 3, the user 1 has a relationship with the identity provider 2 and the central identity provider 2 has agreements formed with suppliers 6 so that a trust is formed by certification by the central identity provider 2 that the user 1 is trustworthy and therefore the supplier 6 can accept the authentication of user 1.

Referring back to FIG. 1, the smart card 3 now stands in the place of the central identity provider 2 but certified by that central provider to the supplier 6 such that a minimum of communication is required across networks to link all of the parties together. This eliminates a potential bottleneck in the provision of service from the supplier 6 to the user 1 since there is no requirement for either to have a link to the identity provider 2. The identity provider 2 will provide authorisation to the processor 4 of the smart card 3 along with information concerning trust strength 7 and the personal information 8 which are used in identifying the user 1 for the purposes of issuing a secure token. The personal information need not necessarily be provided since only authentication 5 and the trust strength 7 are required for a token to be issued. It will be noted that tokens issued are single use tokens only and are not stored anywhere in the card 3 itself but are generated at the appropriate time of use. Thus, once the card 3 is issued to the user 1 the user can provide a digitally signed token to a supplier 6 to enable services to be provided.

Figure 2:
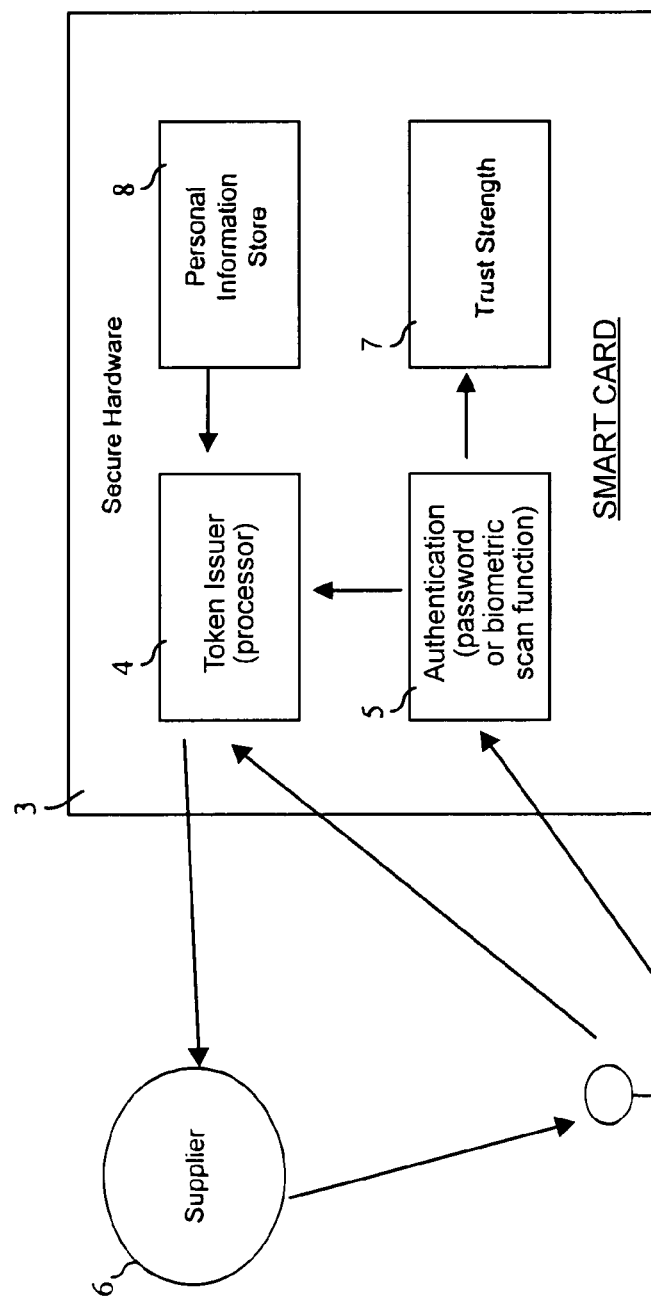
FIG. 2 is a schematic representation of the authentication process between supplier and user.

Thus, referring to FIG. 2, when user 1 wishes to access service provided by the supplier 6 the user identifies to the authentication module 5 by entering a password or using a fingerprint or iris scan to certify presence with the card 3. The token issuer 4 determines the strength of authentication and determines from the trust strength and quality of authentication whether a token can be issued. The issued token may or may not contain personal information from the personal information store 8 and the digitally signed token can then be transmitted to the supplier 6 as certification of the trust of the central identity provider 2 in the user 1.

The token issuer 4 may modify the trust strength 7 using a number of features. Thus, each time a token is issued, for example, the trust strength, which may have a numerical value, may be decremented. The token issuer 4 may consider the value of the transaction being undertaken and may have thresholds of value at which the trust strength is reduced. For example, trust strength may be set to a value by the central identity provider 2 and the value reduced by 1 each time a token is issued with a further decrement of 1 for each say 50 of value of transaction.

Trust strength 7 may also be decremented in accordance with the system clock so that the trust strength is decremented over time whereby an unused card or regularly used card will have trust strength decaying towards 0, the trust strength 7 being re-set by the central identity provider 2 on a subsequent connection of the card 3 to the secure central server 2.

In a further development of the system, the central identity provider 2 may require several users to be present in order to allow the program to issue a token. Thus there may be a requirement for a number of individuals to provide authentication to the card 3 prior to issuing a token for use with a supplier 6. thus several identities may be stored on the card and a minimum number of authentication credentials is supplied to the token issuer 4 prior to a token being issued, the trust strength 7 being weaker if less authentication 5 is provided.

Because processing is carried out in a more secure environment that is not having a link to a certifier server 2 there is a reduced risk of capture of token information and identity fraud.

Although the identity module is referred to herein primarily as a smart card it will be appreciated that other devices such as PDAs (Personal Digital Assistants) or PPCs (Personal Portable Computers) may be used. For example, provided secure authentication of the user is possible, any device having a suitably secure communication possibility, a processor and a data store can be programmed to provide certification tokens in the manner specified.

The program of the processor must be secure so that updating of token issuing authorisation, trust strength and value limitations can only occur when the unit is connected to or at the central service provider's location and the user has been authenticated.

Tokens issued must be identifiable to the supplier and may include clock information derived from a real time or system clock with time decay affecting the strength of the trust certified by the token.

The term token as used herein relates to a digitally signed authentication for transmission by way of a communications network to with which the token issuing device is communicating.

What is claimed is:

1. An identity confirmation device comprising:
a memory card including readable data and a writeable data store,
the identity confirmation device being programmable by a security server and including data defining the user identity, data derived from a user feature and digital signature data issued by the security server,
the identity confirmation device being used in combination with a reader arranged to derive the user identity, compare user feature data with the user present and to issue a single use token confirming the validity of a transaction certified by the digital signature data;

wherein the identity confirmation device includes identities of multiple persons stored thereon, the strength of token issued being dependent upon the number of persons whose identity is confirmed at the time of issue of the token.

2. The identity confirmation device as claimed in claim 1 in which only a partial identity is stored for one or more of the multiple persons whereby a plurality of devices in combination are required to issue a token.

3. The set of identity confirmation devices each as claimed in claim 1, in which each individual's personal identity is distributed as partial identities, each identity confirmation device in an authentication set storing a plurality of such partial identities relating to a respective plurality of users whereby a token issued is used to confirm the presence of a sufficient combination of people present to certify the transaction.

4. The identity confirmation device as claimed in claim 1 in which each issued token has an associated trust value, the strength of which decays over time.

5. The identity confirmation device as claimed in claim 4 in which the trust value associated with a single-use token is varied so that the strength of trust is lower for each successive token issued.

6. The identity confirmation device as claimed in claim 4 in which the strength of trust decays more rapidly as the total value of tokens issued increases.

7. The identity confirmation device as claimed in claim 1 further comprising a biometric authentication device, the strength of trust of each token being varied in dependence upon the confidence level in the biometric authenticity determined at the time of issue of the token.

8. The identity confirmation device as claimed in claim 1 in which each token issued includes data defining a time stamp certifying the token for use within a predetermined time window.

9. The identity confirmation device as claimed in claim 1 in which the device in association with public keys in combination substitutes the use of private keys for certification purposes.

10. A method of confirming an identity, said method comprising:

providing an identity confirmation device, programming the identity confirmation device with data defining the user identity, data derived from a user feature and digital signature data issued by the security server, reading the identity confirmation device to derive the user identity, compare user feature data with the user present and issue a single use token confirming the validity of a transaction certified by the digital signature data; and storing identities of multiple persons on the identity confirmation device and varying the strength of an issued token dependent upon the number of persons whose identity is confirmed at the time of issue of the token.

11. The method as claimed in claim 10 including storing only a partial identity for one or more of the multiple persons whereby the issuing of a token is done by a combination of a plurality of devices.

12. The method as claimed in claim 10 further comprising:

distributing the personal identity of each individual as partial identities, and storing a plurality of such partial identities relating to a respective plurality of users in each device in an authentication set whereby a token issued is used to confirm the presence of a sufficient combination of people present to certify the transaction.

13. The method as claimed in claim 10 in which each issued token has an associated trust values the strength of which decays over time.

14. The method as claimed in claim 13 including varying the trust value associated with the single-use tokens so that the strength of trust is lower for each successive token issued.

15. The method as claimed in claim 13 in which the strength of trust decays more rapidly as the total value of tokens issued increases.

16. The method as claimed in claim 10 including varying the strength of trust of each token in dependence upon the confidence level in the biometric authenticity of the data derived from the user feature determined at the time of issue of the token.

17. The method as claimed in claim 10 including the step of including in each issued token data defining a time stamp certifying the token for use within a predetermined time window.

18. The method as claimed in claim 10 including substituting the combination of the identity confirmation device and public keys for the use of private keys for certification purposes.

* * * * *